United States Patent
Mkrtchyan et al.

(10) Patent No.: US 9,250,721 B2
(45) Date of Patent: Feb. 2, 2016

(54) WIRELESS STYLUS DEVICE WITH INTERCHANGEABLE TIPS AND ERASER

(71) Applicant: Disney Enterprises, Inc., Burbank, CA (US)

(72) Inventors: Armen Mkrtchyan, Glendale, CA (US); Bobby Saygan, Ladera Ranch, CA (US); Sunny Lauridsen, Burbank, CA (US); Afsoun Yazdian, Glendale, CA (US); Jieun Kim, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 125 days.

(21) Appl. No.: 13/717,432

(22) Filed: Dec. 17, 2012

(65) Prior Publication Data
US 2014/0168177 A1  Jun. 19, 2014

(51) Int. Cl.
*G06F 3/0354* (2013.01)
*G06F 3/041* (2006.01)

(52) U.S. Cl.
CPC ............ *G06F 3/03545* (2013.01); *G06F 3/041* (2013.01)

(58) Field of Classification Search
CPC .................................................... G03F 3/03545
USPC .................................................. 345/156–184
See application file for complete search history.

(56) References Cited

U.S. PATENT DOCUMENTS

| | | | | |
|---|---|---|---|---|
| 8,648,837 B1* | 2/2014 | Tran et al. | ...................... | 345/179 |
| 2009/0002218 A1* | 1/2009 | Rigazio | .................. | G08C 17/00 341/176 |
| 2009/0022332 A1* | 1/2009 | Van Schaack et al. | ....... | 381/71.1 |
| 2011/0090181 A1* | 4/2011 | Maridakis | .............. | B43K 19/00 345/179 |
| 2011/0313349 A1* | 12/2011 | Krulevitch | .............. | A61M 5/24 604/65 |
| 2012/0299931 A1* | 11/2012 | Monahan | ............ | G06F 3/04883 345/441 |
| 2012/0331546 A1* | 12/2012 | Falkenburg | ......... | G06F 3/03545 726/16 |

OTHER PUBLICATIONS

"HTC Scribe First Impressions on the HTC View 4G; Updated with Video!" *Android Central*. Mar. 22, 2011 <m.androidcentral.com/htc-scribe-first-impressions-htc-view-4g>.

"Apple Takes Huge Steps towards a Graphics Pen for iPad" *PatentlyApple*. Feb. 3, 2011 <http://www.patentlyapple.com/patently-apple/2011/02/apple-takes-huge-steps-towards-a-graphics-pen-for-ipad.html>.

"Pressure Sensitive Drawing on iPad or Android Tablets" *Kickstarter*. Dec. 23, 2011 <http://www.kickstarter.com/projects/jonatherton/jaja-worlds-first-pressure-sensitive-stylus-for-ip?ref=live>.

* cited by examiner

*Primary Examiner* — Carolyn R Edwards
(74) *Attorney, Agent, or Firm* — Farjami & Farjami LLP

(57) ABSTRACT

There is provided a method and system for a wireless stylus device with interchangeable tips and an eraser. The method comprises, detecting a tip connected to the stylus device from a plurality of tips, detecting a movement of the stylus device, determine a code representing a feature of an application of an interactive device based on the tip and the movement, and transmitting the code to an interactive device. The wireless stylus device may include an accelerometer, which may detect an inversion of the wireless stylus device and enable an erasing feature in the application. The wireless stylus device may provide the tip and the movement to the interactive device through a speaker using an audio code, including a frequency or series of sounds.

20 Claims, 4 Drawing Sheets

WIRELESS STYLUS DEVICE WITH INTERCHANGEABLE TIPS AND ERASER

BACKGROUND

Interactive devices with touch sensitive screens have become popular user appliances. These devices commonly range from large computer screens to smaller handheld tablet devices, all the way down to small cell phones and data storage devices. The touch sensitive screens on these devices allow for user interaction with a broad range of applications. Intuitive features of modern interactive devices coupled with touch sensitive screens allow users quick and seamless access to applications, text messaging, email, and a broad range of other desirable features. Furthermore, users may also feel more connected to the device due to the intuitiveness of touch inputs and the ability to transition commonly used techniques between a broad range of devices.

At present, when a user wishes to access and use applications, users commonly use simple touch and finger related motions. These motions allow ease of use, however, users may wish to have more accuracy or a broader range of features. Because the user is limited to the using finger inputs, often accuracy and dexterity can be an issue. Additionally, when users wish to switch between features in an application, the users may have to repeat or execute multiple finger motions. For example, this may occur when a user accesses a drawing application and subtle inaccuracies may cause repeat construction of a proper drawing. Furthermore, the user may continually change drawing features such as tip size, line color, or even erasing. Thus, a user may feel compelled to use an input accessory or another medium.

SUMMARY

The present disclosure is directed to wireless stylus device, substantially as shown in and/or described in connection with at least one of the figures, as set forth more completely in the claims.

DETAILED DESCRIPTION

Figure 1:
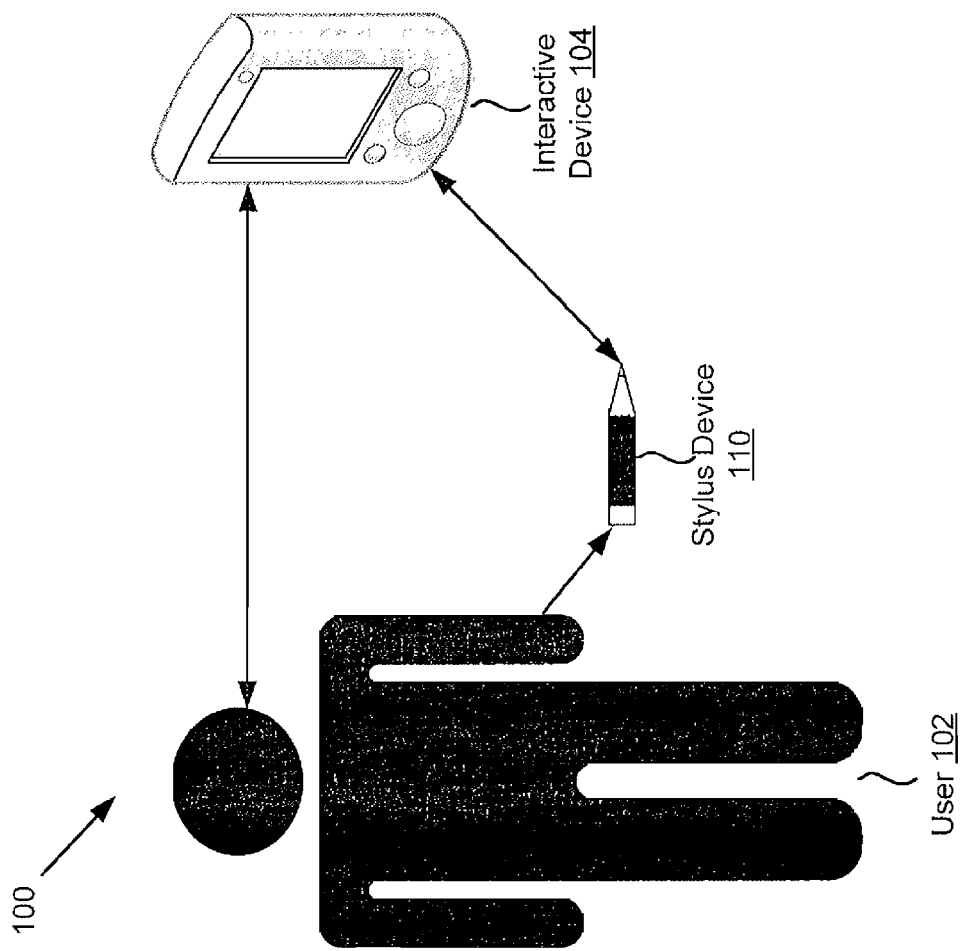
FIG. 1 presents an exemplary environment including a wireless stylus device with interchangeable tips and eraser with an interactive device and user.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary environment including a wireless stylus device with interchangeable tips and eraser with an interactive device and user. As shown in FIG. 1, system environment 100 includes user 102, interactive device 104, and stylus device 110. As further shown, user 102 may view and utilize interactive device 104. User 102 may also use stylus device 110 with interactive device 104.

According to the implementation of FIG. 1, user 102 may view and utilize interactive device 104. Interactive device 104 may correspond to a processing device including a touch sensitive screen for receiving touch inputs from user 102. Although in the system environment 100 of FIG. 1 interactive device 104 is shown as a personal digital assistant, interactive device 104 may be any suitable device with a touch sensitive screen, such as a tablet computer, touch sensitive computer screen, mobile phone, gaming console, or any other suitable means for receiving touch inputs.

During use of interactive device 104, user 102 may access applications stored on interactive device 104. For example, user 102 may use interactive device 104 to access a video game, email application, messaging platform, or drawing application. User 102 may provide touch inputs to touch sensitive screen of interactive device 104 to interact with the application. Finger touches and movements on the touch sensitive screen may provide the inputs.

However, user 102 may desire to use a writing instrument for additional accuracy, comfort, and ease of use. Thus, user 102 may utilize stylus device 110 with interactive device 104. Stylus device 110 may be configured to provide touch inputs to interactive device 104 in a variety of ways, such as tips or nibs with different shapes. User 102 may use stylus device 110 as a writing instrument to write or draw with additional accuracy. Thus, interactive device 104 can more closely mimic the artistic quality of drawing with a pen/pencil/brush and paper.

Stylus device 110 may include additional features as will be explained further in this application. For example, stylus device 110 may include inputs capable of accessing or enabling various features of an application on interactive device 104. In another implementation, stylus device 110 may include an accelerometer capable of detecting motion of stylus device 110. Thus, as will be explained later, stylus device 110 may provide or access additional features of the application on interactive device 104.

Figure 2:
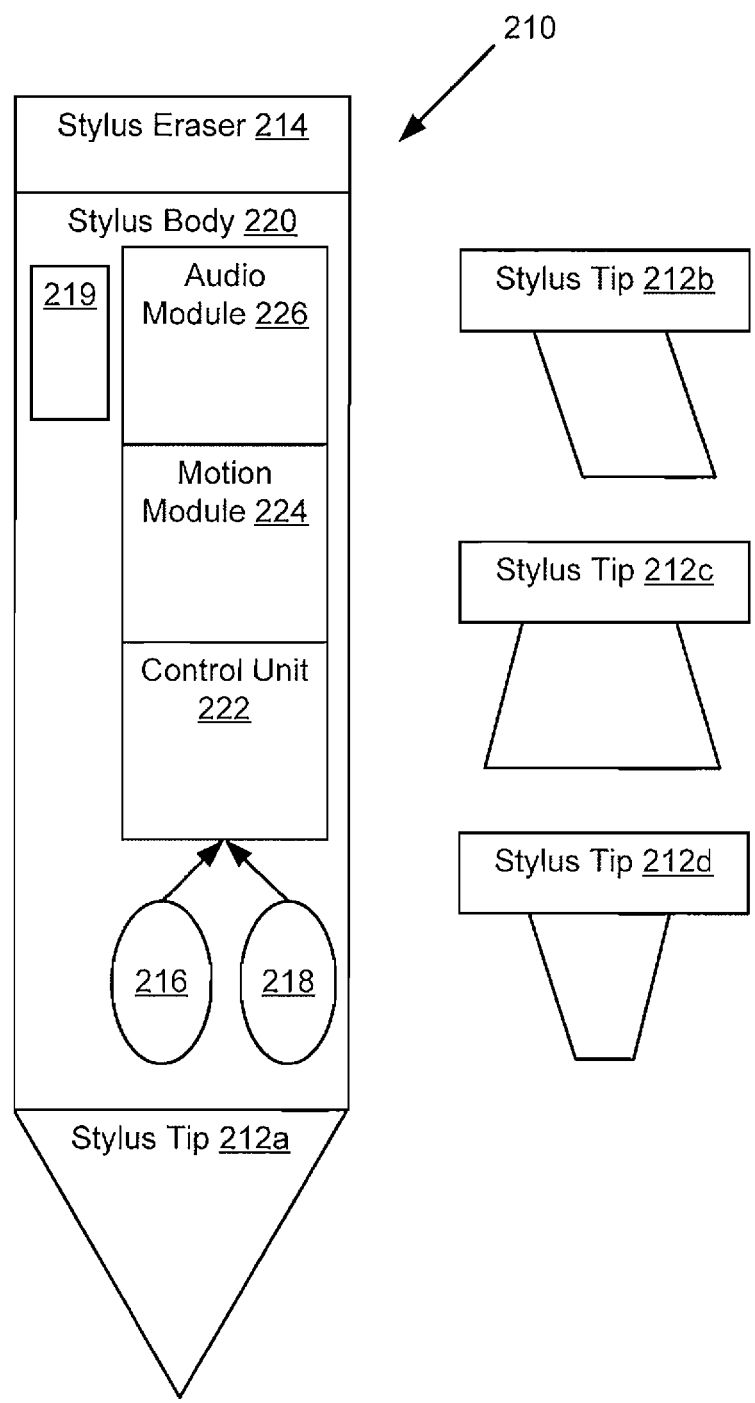
FIG. 2 shows a block diagram with a more detailed example of one implementation of a wireless stylus device with interchangeable tips and eraser.

Turning to FIG. 2, FIG. 2 shows a block diagram with a more detailed example of one implementation of a wireless stylus device with interchangeable tips and eraser. As shown in FIG. 2, stylus device 210 includes stylus tip 212a, stylus eraser 214, and stylus body 220. Also shown in FIG. 2, stylus device 210 includes stylus tips 212b, 212c, and 212d. Stylus body 220 includes input button 216, indicator LED 218, power supply 219, control unit 222, motion module 224, and audio module 226. It is noted that while stylus device 210 is shown with a single input button 216 and indicator LED 218, input button 216 and indicator LED 218 are representative of at least one input button and at least one indicator LED, respectively. Thus, input button 216 may refer to one or a plurality of input buttons, while indicator LED 218 may refer to one or a plurality of indicator LEDs.

As shown in FIG. 2, stylus tip 212a is attached to stylus device 220. In addition, stylus device 210 may include stylus tips 212b, 212c, and 212d. Each stylus tip 212a-d corresponds to a different tip shape, such as a different shaped tip of a writing instrument (i.e., a pen, pencil, marker, paintbrush, or other writing instrument). Thus, as can be seen in FIG. 2, stylus tip 212a may correspond to a general pointed tip, while interchangeable stylus tip 212b may correspond to a marker or highlighter shaped tip. Further, stylus tip 212c may correspond to a stamp, and stylus tip 212d may correspond to a crayon shaped tip. Thus, each stylus tip 212a-d may correspond to a different style of writing instrument. While four total stylus tips 212a, 212b, 212c, and 212d are shown in FIG. 2, it is understood that more or less stylus tips with different styles may be incorporated with stylus device 210. Consequently, stylus device 210 may offer a broad range of different style writing instruments by varying the shape, size, or other attribute of stylus tip 212a-d.

In FIG. 2, stylus tips 212b-d are shown as detached from stylus device 210. Thus, tips 212b-d may come together with stylus device 210 in a package. However, in another implementation, stylus tips 212b-d or additional interchangeable stylus tips may be separately purchasable or obtainable. In either implementation, stylus tip 212a may therefore be detachable from stylus body 220. Thus, a user, such as user 102, may remove stylus tip 212a and replace it with one of stylus tip 212b-d. This provides the user with a new tip shape corresponding to a different writing instrument type.

While stylus tips 212b-d are shown as detached in FIG. 2, in other implementations, stylus tips 212a-d may all be incorporated into stylus device 210, such as located within stylus body 220. In such an implementation, selection of stylus tip 212a-d may be through mechanical or electronic selection. For example, stylus body may include input button 216. Input button 216 may correspond to one button or a plurality of buttons. In one implementation, input button 216 may cause selection of stylus tip 212a-d. Thus, stylus tips 212a-d may be incorporated within stylus device 210 instead of detachable as shown in FIG. 2.

Stylus device 210 of FIG. 2 includes stylus eraser 214. Stylus eraser 214 may correspond to a tip or nib attached to stylus device 210 that is similar in shape to a conventional eraser. When a user of stylus device 210 attempts to use stylus eraser 214, the user may feel as though that are using a conventional eraser.

In order to use stylus eraser 214, a user of stylus device 210 inverts stylus device 210 to use stylus eraser 214 on a touch sensitive screen. In order to detect the inversion of stylus device 210, stylus body 220 includes control unit 222 and motion module 224. Control unit 222 may correspond to a processing device, such as a microprocessor or similar hardware processing device. Motion module 224 may correspond to an accelerometer, gyroscope, or inclinometer. For example, in one implementation, motion module 224 may be a ball-type accelerometer capable of detecting inversion of a device. Thus, when a user inverts stylus device 210, the inversion of stylus device 210 may be detected. In another implementation, motion module 224 may be a spring-type accelerometer capable of detecting shaking or jostling of the device. Motion module 224 may be any sufficient module for detecting motion input by the user of stylus device 210. Thus, motion module 224 detects movement of stylus device 210.

Once motion module 224 has detected an inversion or movement of stylus device 210, motion module 224 transmits that information to control unit 222. Control unit 222 processes the information and accesses audio module 226. Audio module 226 may correspond to a speaker, a microphone and speaker set, or another unit capable of audio transmission. Upon detection of a movement of stylus device 210, control unit 222 causes audio module 226 to transmit a code to an interactive device, such as interactive device 104. The code may correspond to an audio code and include a specific frequency or series of audio tones, emissions, or other audio emission. Reception of the code by the interactive device will be discussed in more detail in reference to FIG. 3.

As discussed above, audio module 226 may correspond to a microphone and speaker set in certain implementations. In such implementations, audio module 226 may also receive audio input, such as voice input, or input from an interactive device, such as interactive device 104 of FIG. 1. Thus, audio module 226 may receive input, where control unit 222 processes the input and is reactive. For example, audio module 226 may receive audio input from a user such as a voice command "stop," "erase," "save," and/or "quit." Control unit 222 may process these commands and respond to the command, such as by turning off stylus device 210, issuing a corresponding code from audio module 226 to an interactive device, or additional responses. Audio module 226 may also receive input from an interactive device. For example, audio module 226 may receive a request from an interactive device running an application to identify stylus tip 212a attached to stylus device 210. Control unit may process this request and transmit a code identifying stylus tip 212a in response.

Although FIG. 2 shows audio module 226, in other implementations, audio module 226 may be any suitable means for transmitting a code to an interactive device. Thus, audio module 226 may be replaced by a general transmitter, such as a radio frequency transmitter, Bluetooth transmitter, wireless transmitter, or direct wired transmitter.

Control unit 222 also detects stylus tip 212a from stylus tips 212a-d attached to stylus device 210. Detection can be done through varying the placement or structure of metal contacts between stylus tips 212a-d and stylus device 210, or by varying resistance values of connections between stylus tips 212a-d and stylus device 210. Thus, control unit 222 may determine which of stylus tips 212a-d are attached to stylus device 210 at the present time. As previously explained, each stylus tip 212a-d may be removable and attachable to stylus body, or may be selected through mechanical or electronic selection. When control unit 222 detects a new or different stylus tip from stylus tips 212a-d, control unit causes audio module 226 to transmit a code corresponding to the interchangeable stylus tip of stylus tips 212a-d attached to stylus body 220. Control unit 222 may also transmit a code when a user picks up or activates stylus device 210. Control unit may determine stylus device is activated through movement detection by motion module 224 or through input button 216. As discussed above, the code may correspond to an audio code and may include a specific frequency or series of audio tones, emissions, or other audio emission.

As previously discussed, stylus body 220 includes input button 216. Input button 216 may correspond to a single input button, a plurality of input buttons, or other input features, such as sliding buttons or wheel-shaped buttons. Input button 216 may be used to assist in selection of stylus tip 212a-d as previously discussed or may function as an on/off button. Input button 216 may have further functionality as well, depending on the requirements of stylus device 210. For example, input button 216 may correspond to an input button capable of selecting or scaling line intensity or thickness within an application on an interactive device. Input button 216 may also be capable of selecting color or color intensity within an application of an interactive device. Input button 216 may enable selection of other features of the application, such as line type, erasure, reset, clear, or any other feature of an application as desired by the user. Input button 216 may also be used as an on/off switch as well in order to deactivate stylus device 210 or exit/close a corresponding application on an interactive device. All of these functions of input button 216 may have a code associated with the selection so that, as discussed above, control unit 222 may utilize audio module 226 to emit a code that an interactive device can receive and process.

Additionally, stylus device 210 of FIG. 2 includes indicator LED 218. Indicator LED 218 can provide information of the status of stylus device 210. For example, indicator LED 218 may light up when stylus device 210 is emitting a code from audio module 226, or electronically switching stylus tip 212*a-d* in order to let the user know that stylus device 210 has sufficient power to perform that action. Further, indicator LED 218 may correspond to an RGB tricolor or other multi-color LED. In such an implementation, a user of stylus device 210 may view a color being used within an application on indicator LED 218. Thus, indicator LED 218 may tell the user the color and may change color as the user alters the color within the application. Further, the color may be selected using input button 216, thus the user may utilize input button 216 and indicator LED 218 of stylus device 210 to view and change colors within an application.

As further shown in FIG. 2, stylus device 210 includes power supply 219. Power supply 219 provides any necessary power to the components of stylus device 210. In one implementation, power supply 219 may correspond to a battery, such as a common alkaline double AA size battery. However, power supply 219 may correspond to any sufficient power supply for stylus device 210, including a rechargeable battery (for example, a common lithium-ion battery), a direct power connection (for example, a connection to an outside power supply), a connection to an interactive device, or any other suitable power source.

Figure 3:
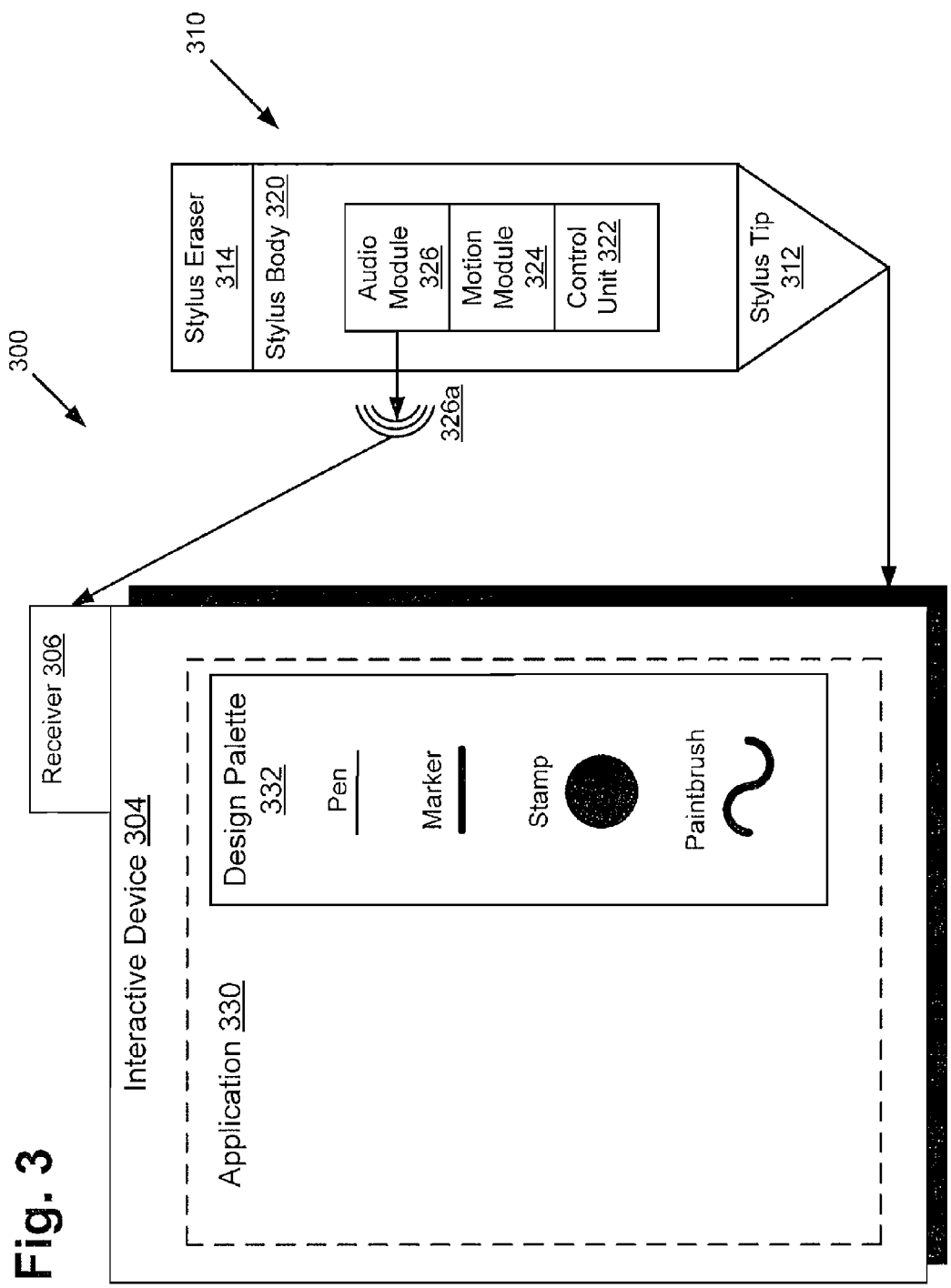
FIG. 3 shows an exemplary system environment with a wireless stylus device with interchangeable tips and eraser for use with an interactive device.

Referring now to FIG. 3, FIG. 3 shows an exemplary system environment with a wireless stylus device with interchangeable tips and eraser for use with an interactive device. As shown in FIG. 3, stylus device 310 includes stylus tip 312, stylus eraser 314 and stylus body 220 containing control unit 322, motion module 324, and audio module 326. Audio module 326 is shown transmitting code 326*a*. Further, FIG. 3 also shows interactive device 304 including receiver 306, where receiver 306 is receiving code 326*a*. Interactive device 304 is also shown running application 330, where application 330 contains design palette 332.

As shown in FIG. 3, stylus device 310 transmits code 236*a* as discussed above in reference to FIG. 2. For example, motion module 324 may detect an inversion of stylus device 310 and transmit that information to control unit 322. Control unit 322 may then utilize audio module 326 to emit code 326*a* corresponding to an inversion of stylus device 310. As discussed above, code 326*a* may be any suitable audio code that is detectable by receiver 306 of interactive device 304. Examples include specific frequencies, series of audio emissions, or other audio emission perceptible by receiver 306. Receiver 306 of interactive device 304 then receives code 326*a*.

Receiver 306 is connected to interactive device 304 in FIG. 3, such as in the case of a receiving microphone of an interactive device. After receiving code 326*a* from stylus device 310, interactive device 304 process code 326*a*. Although receiver 306 is shown as attached to interactive device 304 in FIG. 3, receiver 306 may be detachable or wirelessly connected to interactive device 304, such as in the case of a wireless headset. Thus, receiver 306 may be a Bluetooth, infrared (IR), or wireless connected receiving microphone, or any other suitable device for detecting code 326*a* and transmitting code 326*a* to interactive device 304.

Interactive device 304 is shown running application 330 in FIG. 3. Application 330 is depicted as a drawing application containing design palette 332 in FIG. 3. However, application 330 may correspond to a variety of applications, such as games, finance applications, writing applications, spreadsheets, or any other application. As previously discussed, interactive device 304 contains a touch sensitive screen enabling touch inputs to application 330. Thus, a user generally may provide touch inputs to the touch sensitive screen of interactive device 304 to perform actions, input data and/or commands, or otherwise utilize application 330. For example, the user may perform actions in a drawing application such as application 330, such as drawing, coloring, selecting writing instruments, erasing, or any other suitable interaction.

As previously discussed, while a user may perform such actions with a fingertip in application 330, the user may wish to use stylus device 310 for additional accuracy and/or comfort. Thus, the user may utilize stylus device 310 on the touch sensitive screen of interactive device 304. Within application 330, stylus device 310 may then draw using one of the selected writing instruments shown in design palette 332. Selection of the writing instrument from design palette 332 may be done manually, such as by finger touch input or touch input using stylus device 310. For example, stylus device 310 may select the pen type writing instrument in design palette 332. At that point, the user may draw in application 330 using the pen type writing instrument.

However, as previously discussed, stylus device 310 transmits code 326*a* identifying stylus tip 312 attached to stylus device 310. In such an implementation, control unit 322 detects stylus tip 312 attached to stylus device 310. The detection may occur from contacts between stylus tip 312 and stylus device 310, such as contact patterning or resistance. The detection may also correspond to electronic or mechanical selection of stylus tip 312. After detecting stylus tip 312 attached to stylus device 310, control unit 322 utilizes audio module 326 to transmit code 326*a* to receiver 306 of interactive device 304. Receiver 306 may correspond to a microphone. Receiver 306 may be continually active or may be activated to receive code 326*a* under specific conditions, such as when application 330 is running on interactive device 304.

After receiving code 326*a*, application 330 running on interactive device 304 then identifies the correct writing instrument matching stylus tip 312. For example, when stylus tip 312 corresponds to a pen shaped tip, application 330 will select the pen type writing instrument from design palette 332. In the event that stylus tip 312 is a marker shaped tip, application 330 will select the marker type writing instrument from design palette 332. Thus, when a user of stylus device 310 changes stylus tip 312, stylus device 310 transmits code 326*a* to receiver 306 of interactive device 310. Code 326*a* identifies a corresponding writing instrument in application 330, and application 330 selects the corresponding writing instruments from design palette 332.

In another implementation, stylus device 310 is designed to detect an inversion or movement of stylus device 312. In such an implementation, motion module 324, such as an accelerometer, detects that a user of stylus device 310 has inverted the device to use stylus eraser 314. Control module 322 receives this information from motion module 324, and utilizes audio module 326 to emit code 326*a*. However, in this implementation, code 326*a* corresponds to an erasing feature in application 330. Thus, code 326*a* is a different frequency or series of audio sounds to uniquely identify the erasing feature. Receiver 306 of interactive device 304 receives code 326*a* and application 330 then selects an erasing feature. Thus, when the user presses stylus eraser 314 against the touch sensitive screen of application 330, touch inputs correspond to an erasing feature in application 330 and the user can now erase as needed.

As previously discussed in reference to FIG. 2, stylus device 310 of FIG. 3 may also have input features, such as input button 216 of FIG. 2. Input features may enable a user to turn on and off application 330 or stylus device 310, select color intensity, line thickness, line type (i.e. broken, dotted, etc.), line thickness, or other features. In this implementation, control module 322 receives input from the input features, and utilizes audio module 326 to emit code 326a. However, in this implementation, code 326a corresponds to an application feature selectable by the input. Thus, code 326a is a different frequency or series of audio sounds to uniquely identify the specific input. Receiver 306 of interactive device 304 receives code 326a and application 330 then selects a corresponding application feature. Thus, the user is enabled to access and use the corresponding application feature to the input selected on stylus device 310.

FIGS. 1, 2, and 3 will now be further described by reference to FIG. 4, which presents flowchart 400 describing an exemplary flowchart illustrating a method for use by a stylus device with interchangeable tips and eraser. With respect to the method outlined in FIG. 4, it is noted that certain details and features have been left out of flowchart 400 in order not to obscure the discussion of the inventive features in the present application.

Figure 4:
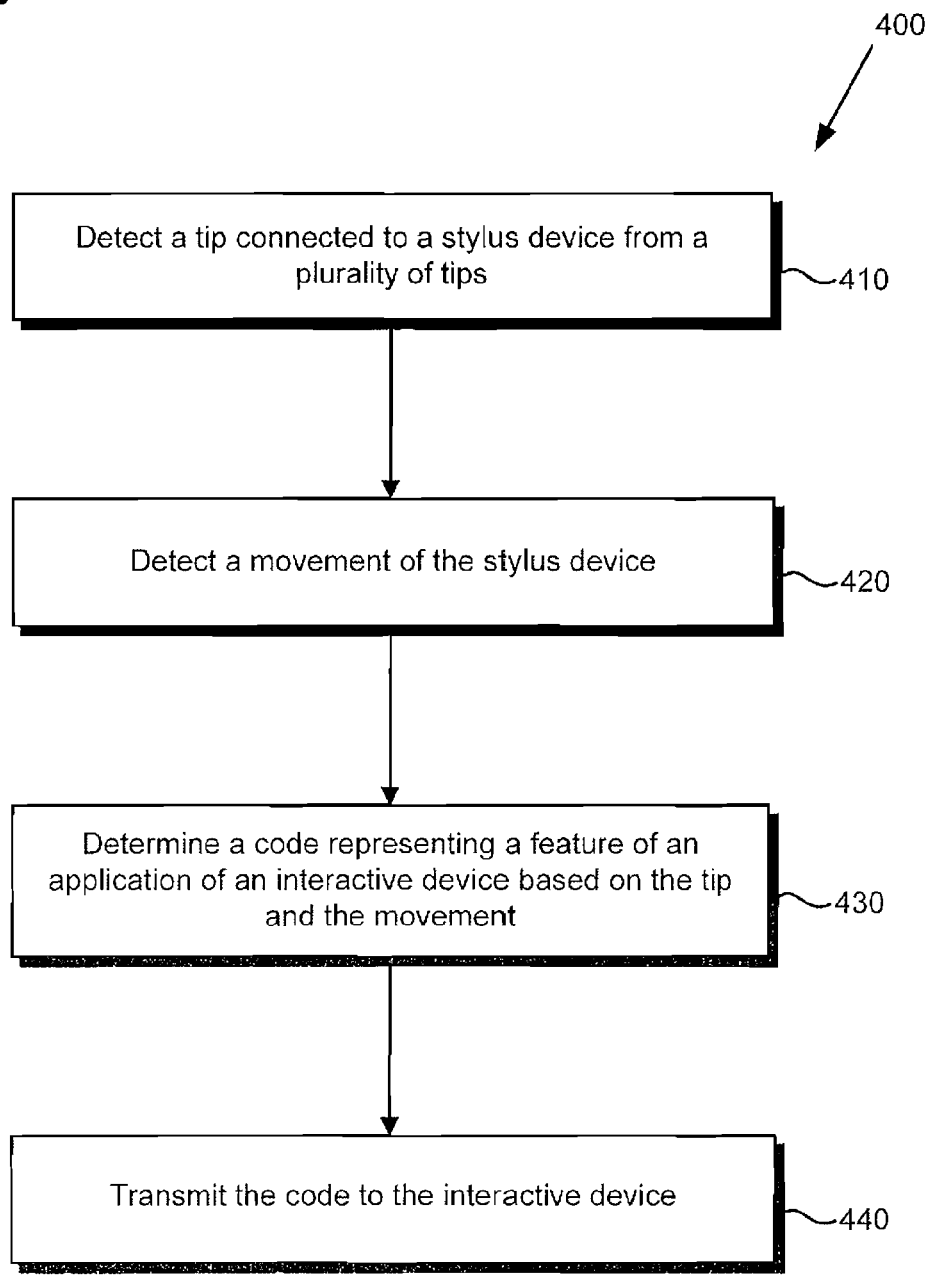
FIG. 4 presents an exemplary flowchart illustrating a method for use by a stylus device with interchangeable tips and eraser.

Referring to FIG. 4 in combination with FIG. 1, FIG. 2, and FIG. 3, flowchart 400 begins with detecting a tip 212a/312 connected to a stylus device 110/210/310 from a plurality of tips 212a-d (410). The detecting may be performed by control unit 222/322 detecting tip 212a/312 connected to stylus device 110/210/310. As previously discussed, the detecting may be done through contacts between the tip 212a/312 and stylus device 110/210/310, or may occur between tip 212a/312 and stylus body 220/320.

Control unit 222/322 may detect which of tips 212a-d is attached to stylus device 110/210/310 through different contact patterning or varying resistance values. For example, tip 212a may use three metal contact points between tip 212a and stylus device 110/210/310, while tip 212b uses four metal contact points. In another implementation, tip 212a may have include a resistor of one value, while tip 212b includes a resistor of another value. The contact patterning and resistance values may differ for each of tip 212a-d so that control unit 222/322 can detect which of tips 212a-d/312 is attached to stylus device 110/210/310.

Flowchart 400 continues by detecting a movement of the stylus device 110/210/310 (420). The detecting may correspond to motion module 224/324 detecting a movement, such as an inversion or shaking, of stylus device 110/210/310. For example, user 102 may invert stylus device 110/210/310 in order to use stylus eraser 214/314 in application 330. Motion module 224/324 detects the inversion and transmits the information to control unit 222/322. Thus, control unit 222/322 detects the movement of stylus device 110/210/310.

Motion module 224/324 may correspond to an accelerometer, gyroscope, or inclinometer capable of detecting movement of stylus device 110/210/310. When motion module 224/324 is an accelerometer, it may be a ball-type accelerometer or a spring-type accelerometer. Motion module 224/324 may be capable of detecting more than an inversion of stylus device 110/210/310. For example, motion module 224/324 may detect shaking or jostling of stylus device 110/210/310. Motion module 224/324 may also detect the current orientation of stylus device 110/210/310, such as if user 102 sets stylus device 110/210/310 down so it is lying on its side. Any movement or orientation detectable by motion module 224/324 may be transmitted to control module 222/322 for processing.

The method of flowchart 400 continues by determining a code 326a representing a feature of an application 330 of an interactive device 104/304 based on the tip 212a/312 and the movement (430). The determining may be performed by control module 222/322 determining code 326a represents a feature in application 330 of interactive device 104/304 after detecting tip 212a/312 and movement from motion module 224. For example, control module 222/322 may determine code 326a corresponds to a pen-type tip of design palette 332 in application 330 when tip 212a/312 is attached to stylus device 110/210/310. In another implementation, control module 222/322 may determine code 326a represents an erasing feature in application 330 when motion module 224 detects an inversion of stylus device 110/210/310.

As discussed above, motion module 224/324 may be capable of detecting further movements of stylus device 110/210/310 and relating the movements to control module 222/322. Thus, shaking or jostling of stylus device 110/210/310 may correspond to additional features in application 330. These features may be intuitive to the motion. In one implementation, when user 102 sufficiently shakes stylus device 110/210/310, control module 222/322 may determine code 326a corresponds to a reset feature, such as resetting the drawing features to a base setting. In another implementation, when user 102 sets the pen down so it is lying on its side, motion module 224/324 may transmit the motion to control module 222/322. This movement may occur user 102 is finished writing or drawing in application 330. Control module 222/322 may then determine code 326a should correspond to saving the current project in application 330, or exiting application 330.

Flowchart 400 continues by transmitting the code 326a to the interactive device 104/304 (440). The transmitting may be performed by audio module 226/326 of stylus device 110/210/310 transmitting code 326a to receiver 306 of interactive device 104/304. In one implementation, code 326a may be an audio code, such as a specific frequency or series of audible sounds. Once receiver 306 receives code 326a, interactive device 104/304 running application 330 may process code 326a and determine a feature in application 330 to select. As discussed above, code 326a may represent an inversion of stylus device 110/210/310, where the user desires to use stylus eraser 214/314. In this example, interactive device 104/304 running application 330 selects an erasing feature in application 330 in response to code 326a.

In this manner, a wireless stylus device with interchangeable tips and eraser may be created for use with an interactive device having a touch sensitive screen. A user may desire the additional accuracy and features not obtainable using basic finger touch inputs. With a wireless stylus device with interchangeable tips and eraser, a user can gain additional performance and comfort in creative and drawing applications.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a stylus device having a motion detector, the method comprising:
   detecting a movement of the stylus device having a tip at a non-inverted end and an eraser at an inverted end;
   determining a code representing a feature of an application of an interactive device based on the movement; and
   transmitting the code to the interactive device by emitting an audio frequency corresponding to the code;
   wherein the detecting of the movement of the stylus device uses the motion detector to detect the stylus device is inverted, and the feature of the application is determined to be an erasing feature based on the motion detector detecting that the stylus device is inverted.

2. The method of claim 1, wherein transmitting uses an audio module for transmitting the code, and wherein the audio module is configured to receive an input from the interactive device.

3. The method of claim 2, wherein the audio module is configured to receive a voice command as the input.

4. The method of claim 1, further comprising:
   receiving input corresponding to a color intensity in the application;
   transmitting the input to the interactive device.

5. The method of claim 1, further comprising:
   receiving input corresponding to a color in the application;
   transmitting the input to the interactive device.

6. The method of claim 1 further comprising:
   selecting the tip from a plurality of tips;
   detecting the tip connected to the stylus device from the plurality of tips; and
   determining the code representing a feature of an application of an interactive device based on the tip.

7. The method of claim 6, wherein the selecting the tip from the plurality of tips is done by one of electronic selection and mechanical selection.

8. The method of claim 6, after the detecting of the tip, the method comprises sending a tip code to the interactive device corresponding to the tip connected to the stylus device, wherein each of the plurality of tips has a corresponding code.

9. The method of claim 1, wherein the code to represent the feature of the application corresponds to a series of audio sounds.

10. A stylus device for use with an interactive device including a surface that detects pressure by the stylus device, the stylus device comprising:
   a module configured to detect a movement of the stylus device;
   an audio module;
   a control unit configured to:
      detect the movement of the stylus device having a tip at a non-inverted end and an eraser at an inverted end;
      determine a code representing a feature of an application of the interactive device based on the movement; and
      transmit the code to the interactive device by emitting an audio frequency corresponding to the code using the audio module;
   wherein the detecting of the movement of the stylus device uses the motion detector to detect the stylus device is inverted, and the feature of the application is determined to be an erasing feature based on the motion detector detecting that the stylus device is inverted.

11. The stylus device of claim 10, wherein transmitting uses an audio module for transmitting the code, and wherein the audio module is configured to receive an input from the interactive device.

12. The stylus device of claim 10, wherein the stylus device further comprises an input to select color intensity in the application.

13. The stylus device of claim 10, wherein the stylus device further comprises an input to select color in the application.

14. The stylus device of claim 10, wherein the stylus device further comprises an input to select the tip from a plurality of tips.

15. The stylus device of claim 10, wherein the stylus device further comprises a microphone.

16. The stylus device of claim 10, wherein the control unit is further configured to send a tip code to the interactive device corresponding to the tip connected to the stylus device, wherein the tip is selected from a plurality of tips, and wherein each of the plurality of tips has a corresponding code.

17. The stylus device of claim 10, wherein the transmitting the code uses a series of audio sounds to represent the feature of the application.

18. The stylus device of claim 10, wherein the audio module is configured to receive a voice command as the input.

19. A system comprising:
   a stylus device;
   a plurality of tips, wherein the plurality of tips are configured to apply pressure to a surface, and wherein each of the plurality of tips is attachable to the stylus device and interchangeable with another one of the plurality of tips;
   a module configured to detect a movement of the stylus device;
   a speaker;
   a control unit configured to:
      detect the movement of the stylus device having one of the plurality of tips at a non-inverted end and an eraser at an inverted end;
      determine a code representing a feature of an application of an interactive device based on the movement; and
      transmit the code to the interactive device by emitting an audio frequency corresponding to the code using the speaker;
   wherein the detecting of the movement of the stylus device uses the motion detector to detect the stylus device is inverted, and the feature of the application is determined to be an erasing feature based on the motion detector detecting that the stylus device is inverted.

20. The system of claim 19, wherein the plurality of tips are interchangeable through one of electronic selection and mechanical selection.

* * * * *